US006798735B1

(12) United States Patent
Tzannes et al.

(10) Patent No.: US 6,798,735 B1
(45) Date of Patent: Sep. 28, 2004

(54) ADAPTIVE ALLOCATION FOR VARIABLE BANDWIDTH MULTICARRIER COMMUNICATION

(75) Inventors: Marcos Tzannes, Lexington, MA (US); George Kechriotis, Arlington, MA (US); Pui Wu, Malden, MA (US)

(73) Assignee: Aware, Inc., Bedford, MA (US)

( * ) Notice: Subject to any disclaimer, the term of this patent is extended or adjusted under 35 U.S.C. 154(b) by 0 days.

(21) Appl. No.: 09/421,835

(22) Filed: Oct. 20, 1999

Related U.S. Application Data

(63) Continuation of application No. 08/873,421, filed on Jun. 12, 1997, now Pat. No. 6,072,779.
(60) Provisional application No. 60/019,637, filed on Jun. 12, 1996.

(51) Int. Cl.[7] .............................................. H04J 11/00
(52) U.S. Cl. ........................ 370/207; 370/252; 370/468
(58) Field of Search ................................ 370/203, 206, 370/207, 252, 329, 341, 343, 468, 480, 503, 509, 512; 455/450, 451, 452, 509, 63; 375/222, 260, 346

(56) References Cited

U.S. PATENT DOCUMENTS

| 3,573,380 A | 4/1971 | Darlington | 179/15 |
| 4,131,766 A | 12/1978 | Narasimha | 179/15 |
| 4,568,156 A | 2/1986 | Dane | 350/632 |

(List continued on next page.)

FOREIGN PATENT DOCUMENTS

| EP | 0473465 A1 | 3/1992 | H04M/1/72 |
| EP | 0652677 A2 | 5/1995 | H04N/7/24 |
| EP | 0703685 A2 | 3/1996 | H04L/1/18 |
| EP | 0753947 A | 1/1997 | |
| EP | 0762701 A2 | 3/1997 | H04L/27/26 |
| EP | 0812087 A | 12/1997 | |
| EP | 0820168 A2 | 1/1998 | H04L/5/14 |

(List continued on next page.)

OTHER PUBLICATIONS

John A. C. Bingham, "Multicarrier Modulation for Data Transmission: An Idea Whose Time Has Come" May 1990—IEEE Communications Magazine pp. 5–14.

John A. C. Bingham, "RFI Suppression in Multicarrier Transmission System," Amati Communications, San Jose, CA, May 1996 IEEE Communications Magazine, pp. 1026–1030.

PCT Notification of Transmittal of International Preliminary Examination Report, International Application No. PCT/US98/11845, mailed May 14, 1999.

PCT Notification of Transmittal of the International Search Report or the Declaration, International Application No. PCT/US98/11845, mailed Nov. 19, 1998.

PCT International Preliminary Examination Report, International Application No. PCT/US98/11845, 1999.

*Primary Examiner*—Frank Duong
(74) *Attorney, Agent, or Firm*—Miles & Stockbridge PC; Jason H. Vick

(57) ABSTRACT

Data is distributed among the channels of an asymmetric data subscriber loop (ADSL) communications system in accordance with an adaptive algorithm which from time to time measures the signal to noise ratio of the various channels and finds a margin for each channel dependent on achievement (where possible) of a given bit error rate and a desired data transmission rate. The margin distribution is achieved by augmenting the constellation signal to noise ratio to enhance computational efficiency and allow redetermination of bit allocation tables during transmission as necessary. Pairs of bit allocation tables are maintained at the transmitter and receiver and one table of each pair at the transmitter and receiver is updated while the other pair is in use for controlling communication.

20 Claims, 7 Drawing Sheets

U.S. PATENT DOCUMENTS

| | | | |
|---|---|---|---|
| 4,679,227 A | 7/1987 | Hughes-Hartogs | 379/98 |
| 4,731,816 A | 3/1988 | Hughes-Hartogs | 379/98 |
| 4,802,190 A | 1/1989 | Schouhamer Immink | 375/38 |
| 4,912,763 A | 3/1990 | Galand et al. | 381/31 |
| 5,048,054 A | 9/1991 | Eyuboglu et al. | 375/8 |
| 5,128,964 A | 7/1992 | Mallory | 375/39 |
| 5,206,886 A | 4/1993 | Bingham | 375/97 |
| 5,285,474 A | 2/1994 | Chow et al. | 375/13 |
| 5,327,574 A | 7/1994 | Monma et al. | 455/33.2 |
| 5,400,322 A | 3/1995 | Hunt et al. | 370/19 |
| 5,428,790 A | 6/1995 | Harper et al. | 395/750 |
| 5,452,288 A | 9/1995 | Rahuel et al. | 370/19 |
| 5,479,447 A | 12/1995 | Chow et al. | 375/260 |
| 5,497,398 A | 3/1996 | Tzannes et al. | 375/260 |
| 5,521,906 A | 5/1996 | Grube et al. | 370/17 |
| 5,533,008 A | 7/1996 | Grube et al. | 370/17 |
| 5,555,244 A | 9/1996 | Gupta et al. | 370/60.1 |
| 5,596,604 A | 1/1997 | Cioffi et al. | 345/260 |
| 5,598,435 A | 1/1997 | Williams | 375/261 |
| 5,636,246 A | 6/1997 | Tzannes et al. | 375/260 |
| 5,812,599 A | 9/1998 | Van Kerckhove | 375/260 |
| 5,822,372 A | 10/1998 | Emami | 375/260 |
| 6,052,411 A | 4/2000 | Mueller et al. | 375/222 |
| 6,266,348 B1 * | 7/2001 | Gross et al. | 370/252 |

FOREIGN PATENT DOCUMENTS

| | | | | |
|---|---|---|---|---|
| EP | 0840474 A2 | 5/1998 | | H04L/5/14 |
| EP | 0905948 A2 | 3/1999 | | H04L/27/26 |
| WO | WO8607223 | 12/1986 | | |
| WO | 97/15131 | 4/1997 | | H04L/1/12 |
| WO | 98/10556 | 3/1998 | | H04L/5/06 |
| WO | 98/27665 | 6/1998 | | H04B/1/38 |
| WO | 98/57472 | 12/1998 | | H04L/27/26 |
| WO | 99/16224 | 4/1999 | | H04L/27/26 |
| WO | 99/18701 | 4/1999 | | H04L/27/00 |

* cited by examiner

ADAPTIVE ALLOCATION FOR VARIABLE BANDWIDTH MULTICARRIER COMMUNICATION

CROSS REFERENCE TO RELATED APPLICATIONS

This application is a continuation of copending parent application Ser. No. 08/873,421, filed Jun. 12, 1997, entitled "ADAPTIVE ALLOCATION FOR VARIABLE BANDWIDTH MULTICARRIER COMMUNICATION", now U.S. Pat. No. 6,072,779, which parent application claims priority of U.S. provisional application Serial No. 60/019,637, filed Jun. 12, 1996 having the same title. The entirety of the disclosures of said parent and provisional applications are incorporated herein by reference.

TECHNICAL FIELD

This application relates to the field of electronic communication and more particularly to the field of multiband digital signal communication.

BACKGROUND OF THE INVENTION

Conventional multicarrier digital communication is a technique for transmitting and receiving digital signals using a plurality of carriers (subchannels) having different frequencies. Each of the subchannels is used to communicate a different portion of the signal. The transmitter divides the signal into a number of components, assigns each component to a specific one of the carriers, encodes each of the carriers according to the component assigned thereto, and transmits each of the carriers. The receiver decodes each received carrier and reconstructs the signal.

The maximum amount of information that can be encoded onto a particular subcarrier is a function of the signal to noise ratio of the communication channel with respect to that subcarrier. The signal to noise ratio of a communication channel can vary according to frequency so that the maximum amount of information that can be encoded onto one carrier may be different than the maximum amount of information that can be encoded onto another carrier.

Bit loading is a technique for assigning bits to subchannels according to each subchannel's signal to noise ratio. A bit loading algorithm provides a bit allocation table that indicates the amount of information (in bits) that is to be encoded on each of the carriers. That is, for a multicarrier communication system with J carriers, a bit allocation table B[j] indicates, for each j=1 to J, the amount of information that is to be encoded onto each of the J carriers.

Shaping the transmission to match the channel characteristics is known. For example, a technique known as "water pouring" was introduced by Gallager in 1968 ("Information Theory and Reliable Communication", page 389) and by Wozencraft in 1965 ("Principles of Communication Engineering", pp. 285–357). Water pouring involves distributing the energy of the transmission signal according to the channel frequency response curve (a plot of the signal to noise ratio as a function of frequency). The frequency response curve is inverted and the available signal energy (the "water") is "poured" into the inverted curve so that more of the energy is distributed into those portions of the channel having the highest signal to noise ratio. In a multicarrier system in which the transmission band is divided into numerous subchannels, throughput can be maximized by putting as many bits in each subcarrier as can be supported given the "water pouring" energy and a desired error rate.

Other techniques for allocating bits among carriers of a multicarrier signal are known. U.S. Pat. No. 4,731,816 to Hughes-Hartogs discloses a bit loading scheme where one bit at a time is incrementally added to each subcarrier until a maximum rate is achieved. Subcarriers that require the least amount of additional power to support an additional bit are selected first.

U.S. Pat. No. 5,479,477 to Chow et al. discloses a bit loading scheme that is capable of either maximizing the throughput or maximizing the margin for a particular target data rate. Unlike Hughes-Hartogs, Chow et al. determines the bit loading table one carrier at a time (rather than one bit at a time). In Chow et al., all the carriers are sorted in descending order according to the measured signal to noise ratio. The initial subchannels that are selected are the ones capable of carrying the most bits. Using the Chow et al. scheme to maximize the data rate provides a bit loading table similar to that provided by the Hughes-Hartogs algorithm.

In order for the receiver to correctly interpret the received data, both the transmitter and the receiver must use the same bit loading table. When the bit loading algorithm is performed during the initialization phase of communication, the resulting bit allocation table is communicated between the transmitter and receiver to ensure that both the transmitter and the receiver are using the same bit loading table. However, in the event that the communication channel signal to noise ratio characteristics change during communication, it may be necessary to update/change the bit allocation table to more appropriately match the transmission with the channel characteristics. However, when the bit allocation table is changed, it is necessary to synchronize use of the new table with both the transmitter and the receiver. If the transmitter and the receiver use different bit allocation tables at any time, the communications link will suffer significant errors in those subchannels in which the bit allocation tables do not agree.

In addition, determining a new bit allocation table can be time consuming, especially if the bit loading algorithm is computationally intensive, such as that disclosed by Hughes-Hartogs where the bit allocation table is constructed one bit at a time. If the bit allocation table is to be calculated many times during communication between the transmitter and receiver, then spending a relatively long amount of time recalculating the bit allocation table (and hence not communicating data) is undesirable.

One solution is to simply not change the bit loading table after initialization. However, this may be unacceptable in cases where the communication channel signal to noise ratio changes during data transmission. Accordingly, it is desirable to be able to determine a bit loading tableirelatively quickly and to be able to synchronize use of the new table by the transmitter and the receiver.

SUMMARY OF THE INVENTION

In accordance with the present invention, a pair of bit allocation tables are maintained at both the transmitter and the receiver. These tables are updated as needed, using measurements of the signal to noise ratio performed on known data transmitted to the receiver in a control frame separate from the data frame. The transmitter signals the receiver as to which of the two tables is to be used for subsequent communication. Preferably, this is done by transmitting a flag from the transmitter to the receiver at some point during the data transmission; this causes the receiver to thereafter switch the bit loading table it is using for communication to synchronize with the corresponding table at the transmitter.

In the preferred embodiment of the invention, although the invention is not restricted thereto, 69 "frames" of 245.5 microseconds duration each are used to form a "superframe" of 16.94 milliseconds. The first frame of each superframe comprises a control frame that is used to transmit a standard (known) data set from the transmitter to the receiver; the remaining frames contain data. The receiver measures the signal to noise ratios of the received data in this frame for each of the channels and uses this to calculate channel bit allocations for subsequent data transmissions. In practice, it has not been found necessary to calculate the signal to noise ratios for each and every superframe, although this can, of course, be done. Rather, we have found it sufficient for most data transmissions to measure the signal to noise ratios of the channels over several frames, average them, update the bit allocation tables based on the resultant values, and use the bit allocations tables so determined over hundreds or thousands of subsequent frames.

The bit allocation table updating is performed by comparing the measured signal to noise ratio (SNR) in each channel with a constellation signal to noise ratio $SNR[c_j]$, that has been augmented by a trial noise margin M, $SNRa[c_j]=SNR[c_j]+M$. The constellation signal to noise ratio, $SNR[c_j]$, specifies the number of bits $c_j$ ("constellation size") that can be transmitted over a channel j given a specific signal to noise ratio $SNP_j$, where $c_j$ may vary, for example, from 1 to 15. The value of the margin M is dependent on the difference between the amount of data (i.e., number of bits) that can be transmitted across the channels in accordance with the augmented constellation signal to noise ratio $SNR_a[c_j]$ and the amount that is desired to be transmitted (the "target data rate"), N. The value of this margin is varied in order to optimize it for the particular communication conditions as manifested by the measured signal to noise ratios, $SNR_j$.

In particular, the total number of bits that may be transmitted over J channels, each characterized by signal to noise ratio SNRj, is $$N_{max} = \sum_{j=1}^{J} c_j,$$

where the respective $c_j$ are determined from the measured signal to noise ratios, $SNR_j$. See, for example, "Digital Communications" by John G. Proakis, pp. 278ff for channel capacity calculations for quadrature amplitude modulation (QAM) systems, the preferred form of transmission for this invention. Preferably, the channel capacity calculations are performed in advance and stored in the form of lookup tables for rapid access. In the preferred embodiment described herein, the margin M is determined as $M=(10/J)*(N_{max}-N)$. The augmented constellation signal to noise ratio is then given by $SNR_a[c_j]=SNR[c_j]+M$, and this value is used to determine (e.g., by table lookup as described above) the number of bits that can be transmitted over a channel. By augmenting the constellation signal to noise ratio, $SNR[c_j]$, rather than the channel signal to noise ratio, $SNR_j$, fewer additions are required, since the range of constellation sizes (e.g., $c_j=1 \ldots 15$) is typically smaller than the range of channels (e.g., $j=1 \ldots 256$).

As long as the amount of data that can be transmitted over the channels in a given interval differs (as determined by the calculations just described) from the amount of data desired to be transmitted in that interval, i.e., $N_{max} \neq N$, and assuming that certain other exit conditions have not been satisfied, the receiver cycles through a loop that repeatedly adjusts the margin M and recalculates $N_{max}$. To do this, the receiver sets a high margin threshold $M_H$ and a low margin threshold $M_L$. During those superframes in which the bit allocation table is to be recalculated, the high threshold and low threshold margins are initialized to either a first state ($M_L=0$, $M_H=(10/J)*[N_{max}-N]$) or a second state ($M_L=0$, $M_L=(10/J)*[N_{max}-N]$) dependent on whether $N_{max}$ is greater than N or less than N.

Thereafter, in each iteration, either the high or the low margin is adjusted in the search for the condition in which $N_{max}=N$. Specifically, at the beginning of subsequent (non-initialization) iterations, the margin is set to the average of the high and low margin thresholds, $M=(M_H+M_L)/2$, and the augmented constellation signal to noise ratio $SNR_a[c_j]$, the bit allocation table $B[j]$, and the calculated capacity $N_{max}$ are determined.

If the calculated capacity exceeds the desired capacity, i.e., $N_{max}>N$, the receiver increases the low margin threshold margin to M, i.e., it sets $M_L=M$. If the calculated capacity is less than the desired capacity, i.e., $N_{max}<N$, the receiver decreases the high threshold, i.e., it sets $M_H=M$. The iteration then repeats.

The receiver exits from the loop on the occurrence of any of several conditions. A first occurs when it is determined that $N_{max}=N$. This is the desired solution, and represents an optimum equal distribution of margin over the communication channels. A second occurs when the test condition $(N_{max}-N)$ is diverging. A third occurs when the desired equality is not achieved after a defined number of iterations. In one system implemented according to the preferred embodiment described herein, we have found a limit of 16 iterations sufficient.

DETAILED DESCRIPTION OF AN ILLUSTRATIVE EMBODIMENT

Figure 1:
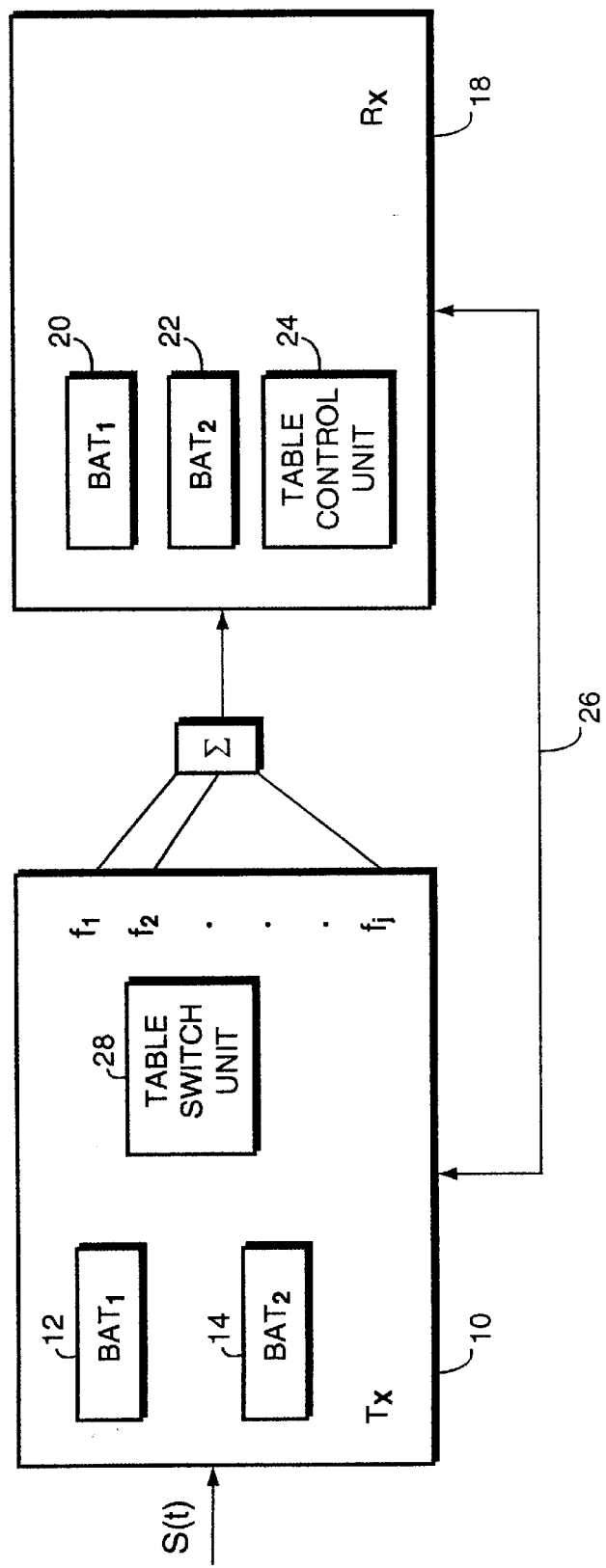
FIG. 1 is a schematic diagram of an ADSL communications system showing bit allocation tables in accordance with the present invention.

In FIG. 1, a transmitter 10 for use in asymmetric data subscriber loop (ADSL) communications has first and second bit allocation tables 12 and 14 for use in assigning data to a plurality of channels for transmission to a remote receiver 16 which has corresponding bit allocation tables 20 and 22. The tables operate in pairs under control of a table switch unit 28 at the transmitter. In accordance with ADSL practice, a digital signal s(t) to be transmitted to a receiver is distributed over a plurality of channels $f_1, f_2, \ldots f_j$, in accordance with channel allocation assignments stored in the bit allocation tables. In particular, the tables B[j] define, for each channel j, the number of bits that can reliably be transmitted over a particular channel at a given bit error rate at the specific signal to noise ratio measured for that channel. These tables are determined as described in detail herein, and may vary from time to time during the course of a transmission.

At any given time, a single table, e.g., table 12, is used for transmission at the transmitter, and a corresponding table, e.g., table 20, is used for reception at the receiver. These tables are images of each other, i.e., contain the same data, and are used in pairs, so that reliable communication can occur. Similarly, tables 14 and 22 are images of each other and are used in pairs.

A table control unit 24 at the receiver controls the formation of the bit allocation tables 12, 14, 20, and 22. It measures the signal to noise ratio on each of the channels $f_1$, $f_2$, ... $f_j$, compares the measured values with predetermined values defining the bit capacity of a channel at given signal to noise values, augmented with noise margins as described herein, and thus determines the bit allocation for each channel. The allocations so defined are stored in the tables 20 and 22 at the receiver. They are also transmitted back to the transmitter, e.g., via a control channel 26, and are there stored as the tables 12 and 14, respectively. After initial loading, the transmission is advantageously arranged such that only updated tables are transmitted back to the transmitter.

At the transmitter 10, a table switch unit 28 selects which of the two table pairs (12, 20; 14, 22) are to be used in a given transmission and reception. Typically, a given pair will continue in use until the communication conditions change sufficiently that the bit allocations among the channels change. At that time, a new table must be formed at the receiver, and communicated to the transmitter. When this occurs, the table switch unit 28 typically will switch to the new table for subsequent transmissions. When it does so, it transmits a flag to the receiver that indicates that a switch to the alternative pair is to take place. This switch will usually be made effective as of the next superframe, but may, by prearrangement with the receiver, be made effective at some agreed upon point after that.

Figure 2:
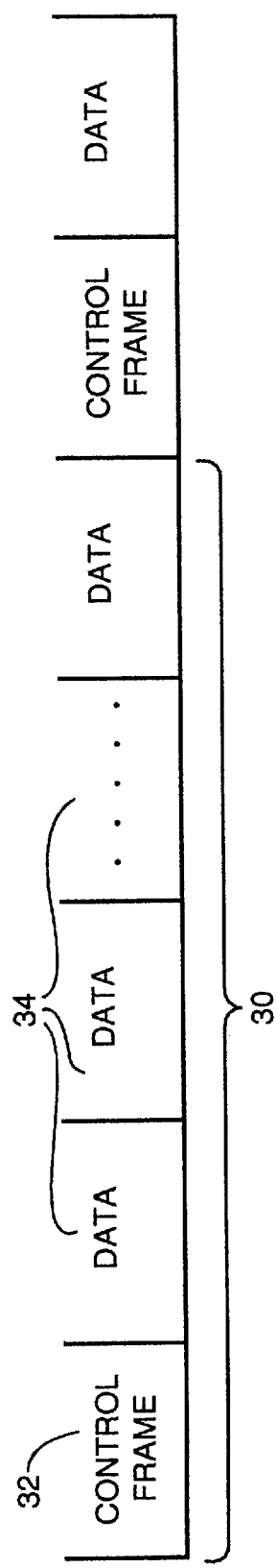
FIG. 2 is a diagram of control and data frames as used in connection with the present invention.

FIG. 2 is a diagram of a superframe 30. It is formed from a control frame 32 and a number of data frames 34. During the control frame interval, the transmitter sends to the receiver a known signal from which the receiver can measure the signal to noise ratio of each of the channels in order to calculate the bit allocations. The remaining frames of the superframe comprise data frames for the transmission of the desired data. In a preferred embodiment of the invention, there are one control frame and 68 data frames, each of 245.5 microsecond duration, for a superframe time of 16.94 milliseconds.

Figure 3:
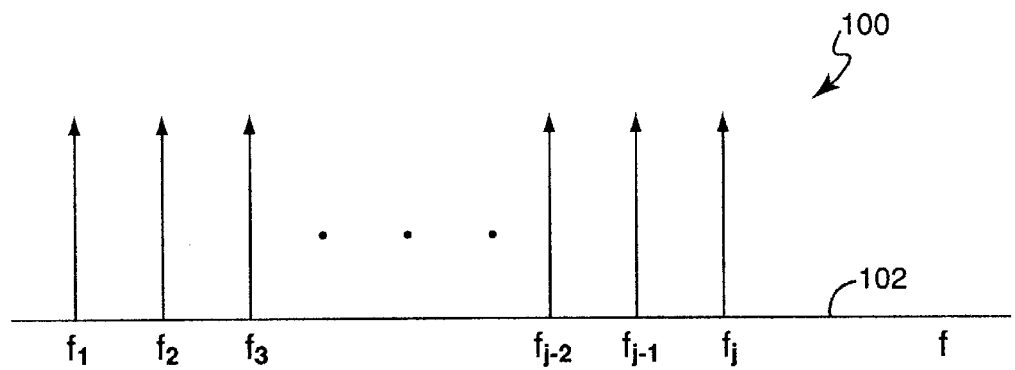
FIG. 3 is a graph illustrating a multicarrier communication system.

Referring to FIG. 3, a graph 100 illustrates multicarrier signal transmission. The graph 100 has a horizontal axis 102 representing frequency wherein lower frequencies are toward the left side of the axis 102 while higher frequencies are toward the right side of the axis 102. The graph 100 illustrates that a multicarrier signal, incorporating J discrete carrier signals, is transmitted via carriers at frequencies $f_1$, $f_2$, ... $f_j$.

Each of the carriers shown in the graph 100 is capable of transmitting a certain number of bits of information. Accordingly, the total number of bits transmitted via the multicarrier signal is the sum of the number of bits that can be transmitted by each of the carriers. For example, if each of the carriers can transmit three bits of information, then the signal shown in the graph 100 can transmit a total of J*3 bits of information.

In a preferred embodiment, each of the carriers transmits information using quadrature amplitude modulation (QAM), a conventional digital signal encoding technique where different combinations of amplitude and phase of each carrier signal represent different digital values. For example, a carrier signal can be encoded using two different possible amplitudes (A1 and A2) and two different possible phases (P1 and P2) so that the carrier can represent one of four possible values: a first value when the carrier signal has amplitude A1 and P1, a second value corresponding to a combination A1 and P2, a third value corresponding to a combination A2 and P1, and a fourth value corresponding to a combination A2 and P2. The various combinations of amplitude and phase for a given carrier signal is called a "constellation". Note that the number of bits that can be transmitted via a particular carrier is a function of the maximum possible constellation size for that carrier.

For each carrier, the maximum size of the constellation, and hence the maximum to number of bits that can be transmitted via that carrier, is a function of the signal to noise ratio (SNR) of the communication channel and is a function of the desired bit error ratio (BER). The BER is the number of single bit transmission/reception errors per the total number of bits transmitted. Increasing the number of discrete amplitudes and/or phases associated with a particular carrier (i.e., increasing the constellation size) increases the likelihood of bit errors. The BER increases with increasing constellation size because, as the number of discrete amplitudes and/or phases increases, the magnitude of the difference between discrete phases and/or amplitudes decreases and hence the ability of the receiver to distinguish between different phase and/or amplitude values decreases.

The relationship between BER and SNR is well-known in the art of multicarrier communication. Tables are available that show the minimum SNR that can support a BER of a fixed amount or less for a given constellation size. For example, the table shown below, SNR[$c_j$], a constellation signal to noise ratio, indicates the minimum SNR needed to transmit a constellation having the indicated size in order to obtain an expected BER of $10^{-7}$ (i.e., an error of one bit per every $10^7$ bits that are transmitted.) Note that as the constellation size increases, the minimum required SNR also increases.

| Constellation size c (in bits) | SNR requirement |
| --- | --- |
| 2 | 14 dB |
| 3 | 19 dB |
| 4 | 21 dB |
| 5 | 24 dB |

Figure 4:
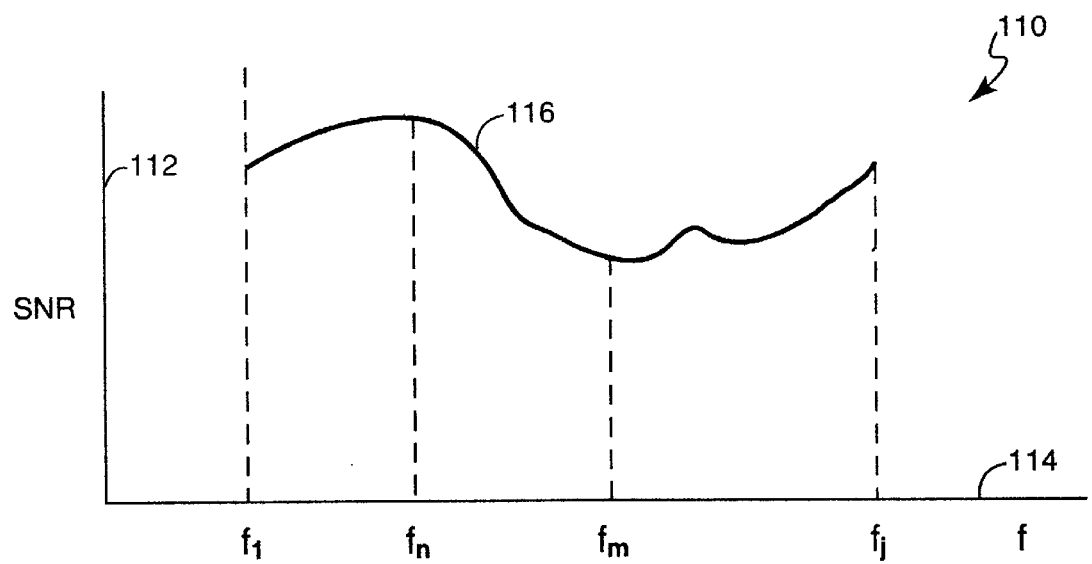
FIG. 4 is a graph illustrating signal-to-noise ratio as a function of frequency.

Referring to FIG. 4, a graph 110 illustrates a relationship between SNR and frequency for a communication channel transmitting a multicarrier signal having carriers s between frequencies $f_1$ and $f_j$. A vertical axis 112 of the graph 110 represents SNR. A horizontal axis 114 of the graph 110 represents frequency in a manner similar to that illustrated in connection with the horizontal axis 102 of the graph 100 of FIG. 3.

A plot 116 shows the relationship between SNR and frequency for the frequencies between $f_1$ and $f_j$, the lowest and highest (respectively) carrier frequencies for the multi-carrier frequency signal. The plot 116 illustrates that the SNR varies according to frequency so that, for example, the SNR at frequency $f_m$ is lower than the SNR at frequency $f_n$. Based on the table shown above, it is possible that, for a given BER, the constellation size supported by the carrier frequency $f_m$ is smaller than the constellation size supported by the carrier frequency $f_n$.

Figure 5:
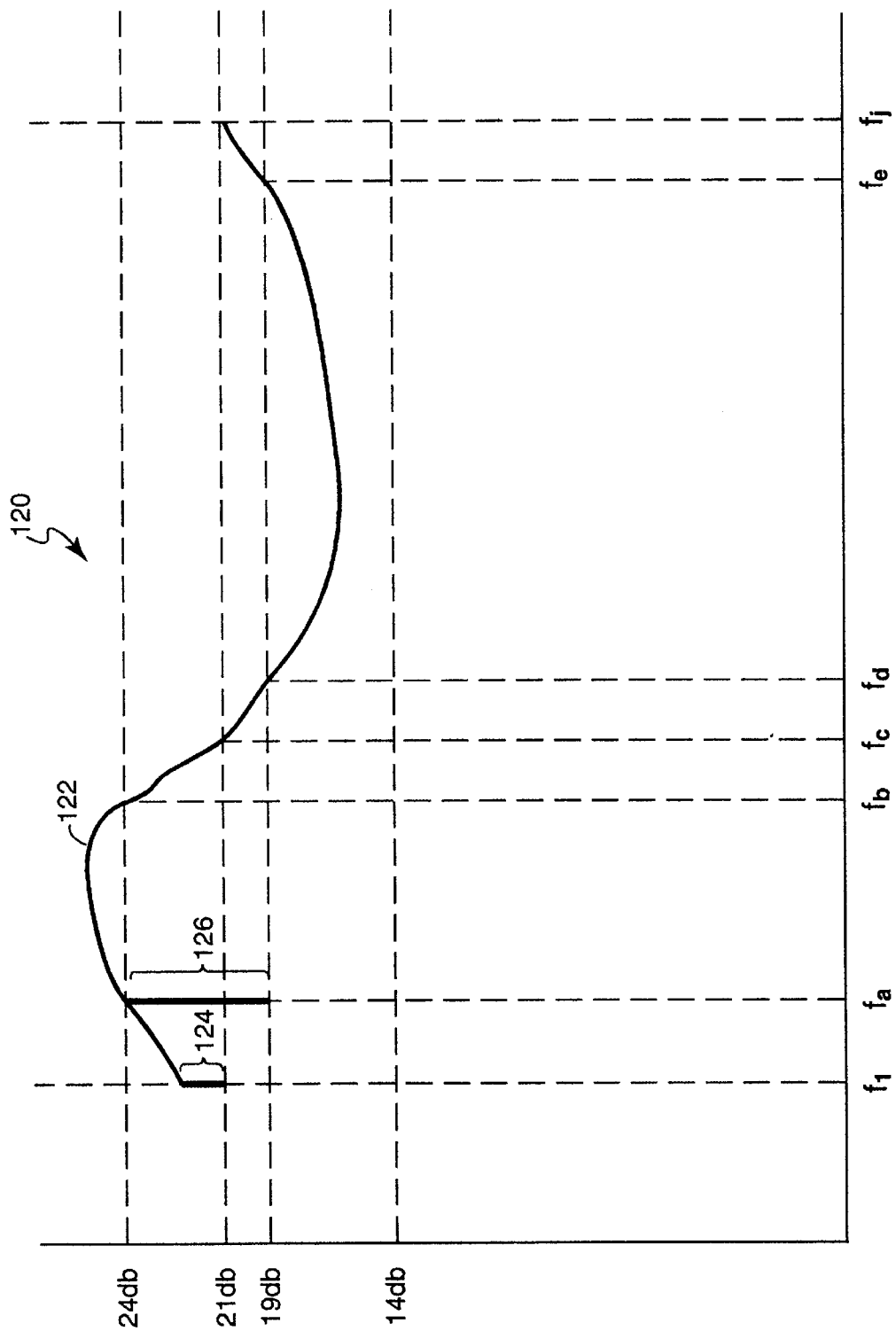
FIG. 5 is a graph illustrating bit loading and margin for a multicarrier communication system.

Referring to FIG. 5, a graph 120 uses a plot 122 to illustrate a hypothetical relationship between SNR and frequency. The graph 120 is similar to the graph 110 of FIG. 4. The vertical axis of the graph 120, which represents SNR, has superimposed thereon the SNR requirement numbers from the table, shown and discussed above, that relates minimum SNR requirements with constellation size for a BER of $10^{-7}$. The graph 120 shows that an SNR of 14 dB is required to support a constellation size of two bits and that SNR's of 19, 21, and 24 are required to support constellation sizes of three, four, and five bits, respectively. Based on this, it is possible to use the plot 122 to determine a maximum constellation size for each of the carrier frequencies between $f_1$ and $f_j$. For example, the plot 122 shows that any carrier frequencies between $f_1$ and $f_a$ can support a maximum constellation size of four bits since all portions of the plot 122 between $f_1$ and $f_a$ are greater than 21 dB (the minimum required SNR to support a constellation size of four bits), but less than 24 dB (the minimum SNR for five bits). No carrier frequencies between $f_1$ and $f_a$ can support a constellation size of five bits at the BER used to generate the minimum SNR requirements.

The portion of the plot 122 between $f_a$ and $f_b$ is shown in FIG. 5 as being greater than 24 dB. Accordingly, carrier frequencies between $f_a$ and $f_b$ can support a maximum constellation size of at least five bits. Similarly, carrier frequencies between $f_b$ and $f_c$ will support a maximum constellation size of four bits; carrier frequencies between $f_c$ and $f_d$ will support a maximum constellation size of three bits; carrier frequencies between $f_d$ and $f_e$ will support a maximum constellation size of two bits, and carrier frequencies between $f_e$ and $f_j$ will support a maximum constellation size of three bits.

The difference between the minimum required SNR and the actual transmission channel SNR is called the "margin". For example, the plot 122 shows that if four bits are used at the carrier frequency $f_1$, the carrier frequency at $f_1$ will have a margin 124 somewhat greater than zero since the SNR at $f_1$ is shown in FIG. 5 as being greater than the minimum SNR requirement of 21 dB. Similarly, it is possible to use less than the maximum supported constellation size at a particular carrier frequency. For example, although the plot 122 shows that a carrier at the frequency $f_a$ will support a constellation size of five bits (since the SNR at $f_a$ is 24 dB), it is possible to encode the carrier at the frequency $f_a$ with only three bits. In that case, the margin at the frequency $f_a$ is the difference between the transmission channel SNR at $f_a$ (24 dB) and the SNR required to support a constellation of three bits at frequency $f_a$ (19 dB). Accordingly, the margin at frequency $f_a$ is 5 dB.

In instances where the multicarrier signal is used to transmit the maximum number of data bits, then the SNR of the communication channel is first measured and then each carrier is set to the maximum supported constellation size. However, in many applications, the multicarrier signal is used to transmit less than the maximum possible number of bits. In those cases, it is advantageous to maximize the overall margin of the signal to thus reduce the error rate. This can be illustrated by a simple example:

Assume a two-channel multicarrier signal has a maximum constellation size of five bits for the first carrier and four bits for the second carrier. Further assume that it is desirable to use the signal to transmit six bits. One way to allocate the bits among the two carriers is to use the first carrier to transmit five bits and the second carrier to transmit one bit. In that case, however, the margin for the first carrier is relatively small while the margin for the second carrier is relatively large. There will be many more errors for bits transmitted via the first carrier than bits transmitted via the second carrier and, since most of the bits are being transmitted via the first carrier anyway, then the overall error rate of the signal, while below the target BER, is still higher than it has to be in this case. A more advantageous way to allocate the bits might be to allocate three bits to each of the two carriers. In that case, both of the carriers operate with a relatively large margin and the overall error rate of the signal is reduced.

Of course, in many multicarrier communication applications, there are hundreds of carriers and hundreds to thousands of bits that are transmitted. In addition, it is necessary to allocate the bits in a relatively rapid manner since time spent allocating bits is time not spent communicating information. Furthermore, it may be necessary to reallocate the bits during communication if the channel transmission characteristics change dynamically.

Figure 6:
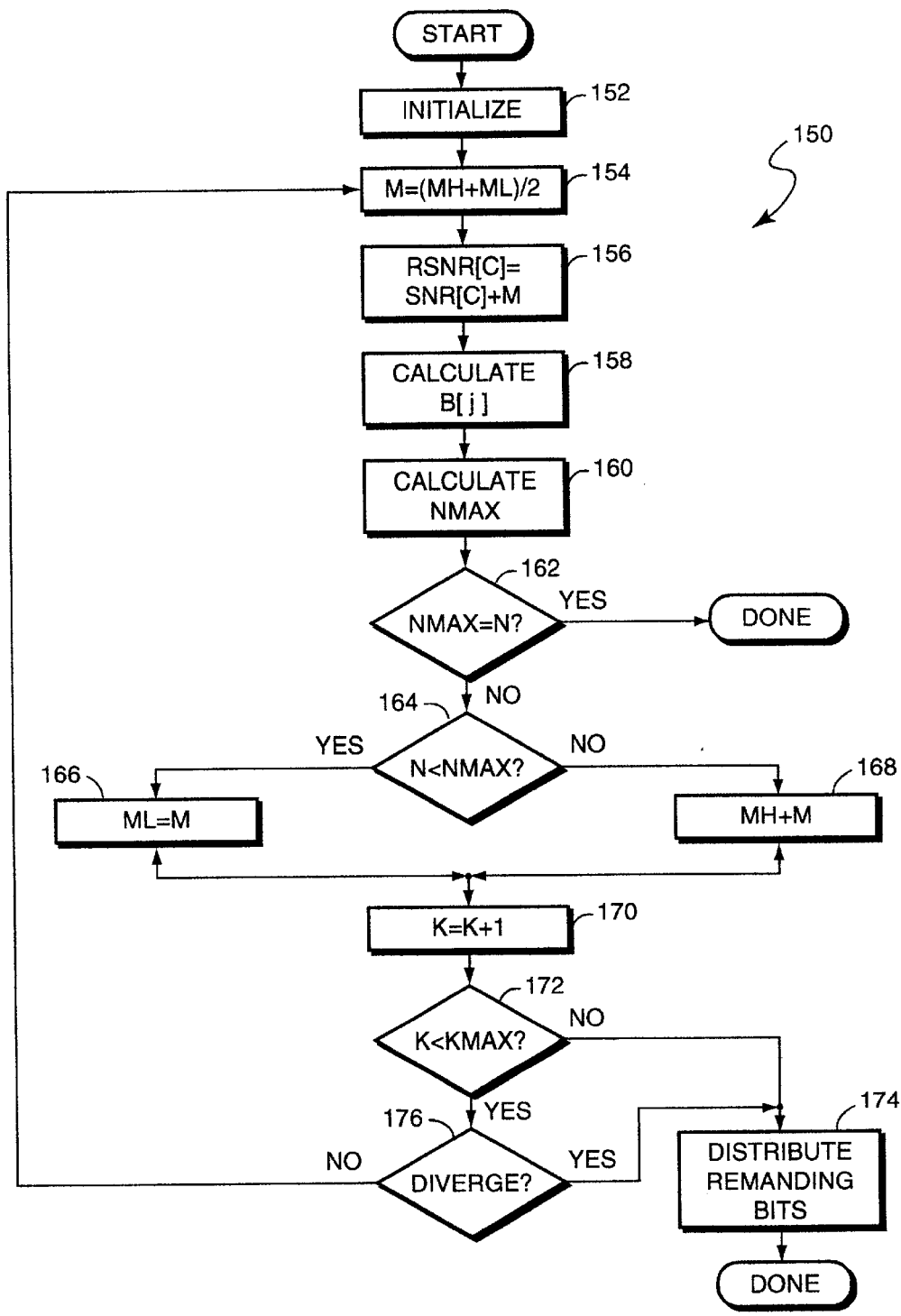
FIG. 6 is a flow chart illustrating a bit loading algorithm for a multicarrier communication system.

Referring to FIG. 6, a flow chart 150 illustrates a technique for allocating bits among carriers of a multicarrier signal. Processing begins at a first step 152 where various quantities used to allocate the bits are initialized. These quantities include MH, the high-bound for the margin, ML, the low-bound for the margin, and k, an iteration counter which is described in more detail below. Following step 152 is a step 154 where the margin, M, is calculated by averaging $M_H$ and $M_L$.

Following step 154 is a step 156 where a table indicating required SNR for various constellation sizes, RSNR[c], is calculated. RSNR[c] is a table having entries equal to the sum of the margin, M, and the minimum SNR requirements that can support a constellation of size c, and thus comprises an augmented constellation signal to noise ratio, SNRa[$c_j$]= SNR[$c_j$]+M. Following step 156 is a step 158 where a bit table, B[j], is calculated. B[j] is a table of the maximum number of bits that can be allocated to each of the carriers $f_1, \ldots f_j$, given the values stored in RSNR[c]. The maximum number of bits are allocated for each carrier in a manner similar to that discussed above in connection with FIG. 5.

Following step 158 is a step 160 where a value $N_{max}$ is calculated. $N_{max}$ represents the maximum number of bits that can be transmitted on the channel and is determined by summing all of the values in the table B[j]. Since the table B[j] contains the maximum number of bits that can be transmitted for each carrier based on the minimum required SNR for each constellation size plus the calculated margin, then $N_{max}$ represents the maximum number of bits that can be transmitted on the channel wherein each of the carriers has a margin of at least M.

Following the step 160 is a test step 162 which determines if $N_{max}$ equals N where N is the number of bits that are to be transmitted using the multicarrier signal. If $N_{max}$ does in fact equal N, then processing is complete and the bit table B[j] represents an allocation of bits among the carriers of the multicarrier signal wherein each carrier will have a margin at least as large as M.

If it is determined at the test step 162 that $N_{max}$ does not equal N, then processing transfers from the test step 162 to a test step 164. Note that if N is less than $N_{max}$, then the margin can be increased (in order to decrease $N_{max}$) in the next iteration. Similarly, if N is not less than $N_{max}$, then the margin is too large and needs to be decreased in the next iteration. If it is determined at the test step 164 that N is less than $N_{max}$, the control transfers from the test step 164 to a step 166 where $M_L$, the low-bound on the margin, is set equal to M. Setting $M_L$ equal to M effectively increases $M_L$, causing an increase in the value of the margin, M, that will be calculated on the next iteration at the step 154.

Conversely, if it is determined at the step 164 that N is not less than $N_{max}$, then control transfers from the step 164 to a step 168 where $M_H$, the high-bound on the margin is set equal to M. This effectively decreases the value of $M_H$, thus causing the value of M to decrease when M is calculated at the step 154 on the next iteration.

Control transfers from either the step 166 or step 168 to a step 170 where the iteration counter, k, is incremented. Following the step 170 is a test step 172 which determines if the iteration counter is less than the maximum allowable value for the iteration counter, $K_{max}$. The iteration counter, k, is used to ensure that the algorithm will terminate after a certain number of iterations even if the terminating condition at the step 162 (i.e., $N_{max}$=N) is never met. In a preferred embodiment, $K_{max}$ equals 16.

If it is determined at the test step 172 that k is not less than $K_{max}$, then control transfers from the step 172 to a step 174 where the remaining bits are either removed or added to the bit table, B[j], as appropriate. Bits are added or removed at the step 174 in a random or pseudo random manner so that the sum of all allocated bits in the table B[j], equals N, the number of bits that are to be transmitted via the multichannel signal. Note that in this instance, there is no guarantee that each of the carriers has a margin of at least M. The step 174 is simply executed in order to finalize the allocation process if the algorithm is unable to meet the termination condition at the step 162.

If it is determined at the test step 172 that the iteration counter, k, is less than the predetermined maximum value for the iteration counter, then control transfers from the step 172 to a test step 176 which determines if the algorithm is diverging, i.e., if ($N_{max}$-N) is increasing. It is desirable for the algorithm to converge so that the value of $N_{max}$ gets closer to the value of N with each iteration because the algorithm terminates when $N_{max}$ equals N at the test step 162. However, if it is determined at the test step 176 that the value of $N_{max}$ is actually getting farther from the value of N with each iteration, then control transfers from the step 176 to the step 174 where the remaining bits are distributed randomly among the values in the table B[j], as discussed above, after which processing is complete.

If it is determined at the test step 176 that the algorithm is not diverging, then control transfers from the step 176 back to the step 154 where the margin is calculated for the next iteration. The margin calculated at the subsequent iteration 154 will either be less than or greater than the margin calculated on the previous iteration, depending upon whether N was less than $N_{max}$ or not at the test step 164, as discussed above.

Figure 7:
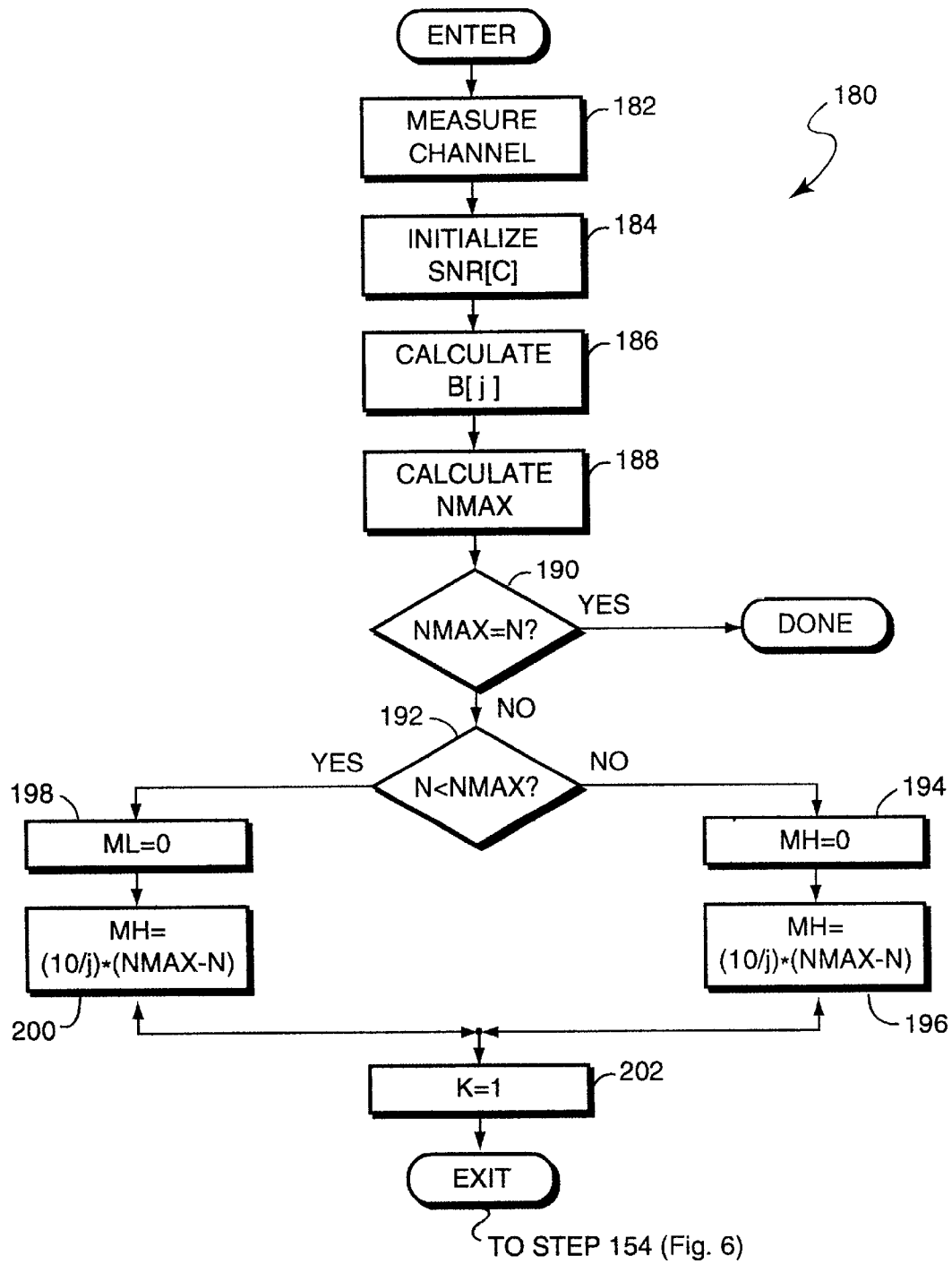
FIG. 7 is a flow chart illustrating initialization for the bit loading algorithm of FIG. 6.

Referring to FIG. 7, a flow chart 180 illustrates in detail the initialization routine for the step 152 of the flow chart 150 shown in FIG. 6. The initialization routine is entered and processing begins at a step 182 where the transmission characteristics of the channel are measured to determine the signal-to-noise ratio at each of the carrier frequencies of the multicarrier signal. As discussed above in connection with FIGS. 4 and 5, the transmission channel signal-to-noise ratio may be a function of frequency. Measuring the channel transmission characteristics at the step 182 is discussed in more detail hereinafter.

Following the step 182 is a step 184 where the minimum required signal-to-noise ratio table, SNR[c], is initialized. As discussed above, for a given bit error ratio (BER), the minimum required SNR for each constellation size, c, can be determined via conventional calculations known in the art or by looking up the values in a textbook. Following the step 184 is a step 186 where the bit table, B[j], is calculated. Calculation of the bit table at the step 186 is similar to calculation of the bit table at the step 158 discussed above in connection with the flow chart 150 of FIG. 6, except that the unaugmented SNR table is $SNR[c_j]$ used at the step 186 rather than the RSNR table which is used at the step 158. Using the SNR table at the step 186 effectively calculates the bit table, B[j], with a margin of zero. Following the step 186 is a step 188 where $N_{max}$ is calculated. The step 188 is similar to the step 160 discussed above in connection with the flow chart 150 of FIG. 6; $N_{max}$ is simply the sum of all the entries in the bit table, B[j].

Following the step 188 is a step 190 where it is determined if $N_{max}$ equals N. If $N_{max}$ does equal N at the step 190, then processing is complete for the entire algorithm (not just the initialization portion) since the channel will only support $N_{max}$ bits of transmission. That is, if $N_{max}$ equals N at the step 190, there is no point in continuing with the algorithm and calculating a margin since, by default, the channel can transmit no more than N bits.

If it is determined at the test step 190 that $N_{max}$ does not equal N, then control transfers from the step 190 to a test step 192 where it is determined if N is less than $N_{max}$. Note that if N is not less than $N_{max}$ at the step 192, then the channel will not support transmission of N bits at the BER used to construct the SNR table at the step 184. That is, the bandwidth of the channel is too low. However, in this case, the algorithm can continue by calculating a negative margin and simply proceeding to maximize the negative margin so that, although the BER that will be achieved will exceed the desired BER, it is still minimized given the requested data rate. In another embodiment, the algorithm can terminate at this point and indicate that the bits cannot be allocated. In yet another embodiment, the algorithm can be rerun using a higher BER and (presumably) lower minimum SNR requirements for the various constellation sizes.

If it is determined at the step 192 that N is less than $N_{max}$ (i.e., the system will not be operating with a negative margin) then control transfers from the step 192 to a step 198 where the low-bound on the margin $M_L$, is set to zero. Following the step 198 is a step 200 where the high-bound on the margin is set using the formula $M_H=(10/J^*)(N_{max}-N)$. Note that, however, in this case the high-bound on the margin will be set to a positive value at the step 200 because $N_{max}$-N will be a positive number.

Following either the step 200 or the step 196, control transfers to a step 202 where the iteration counter that is used to terminate the algorithm after a predetermined number of iterations is set to one. Following the step 202, the initialization routine is exited so that the remaining processing, as discussed above in connection with FIG. 6, can continue.

The formula used to set $M_L$ at the step 196 and to set $M_H$ at the step 200 provides upper and lower bounds of the margin such that the algorithm converges in a reasonable number of iterations while ensuring that the final margin does not fall outside the range between $M_L$ and $M_H$. Of course, it is possible to practice the invention using other formulas or techniques for calculating initial values for $M_L$ and $M_H$.

Figure 8:
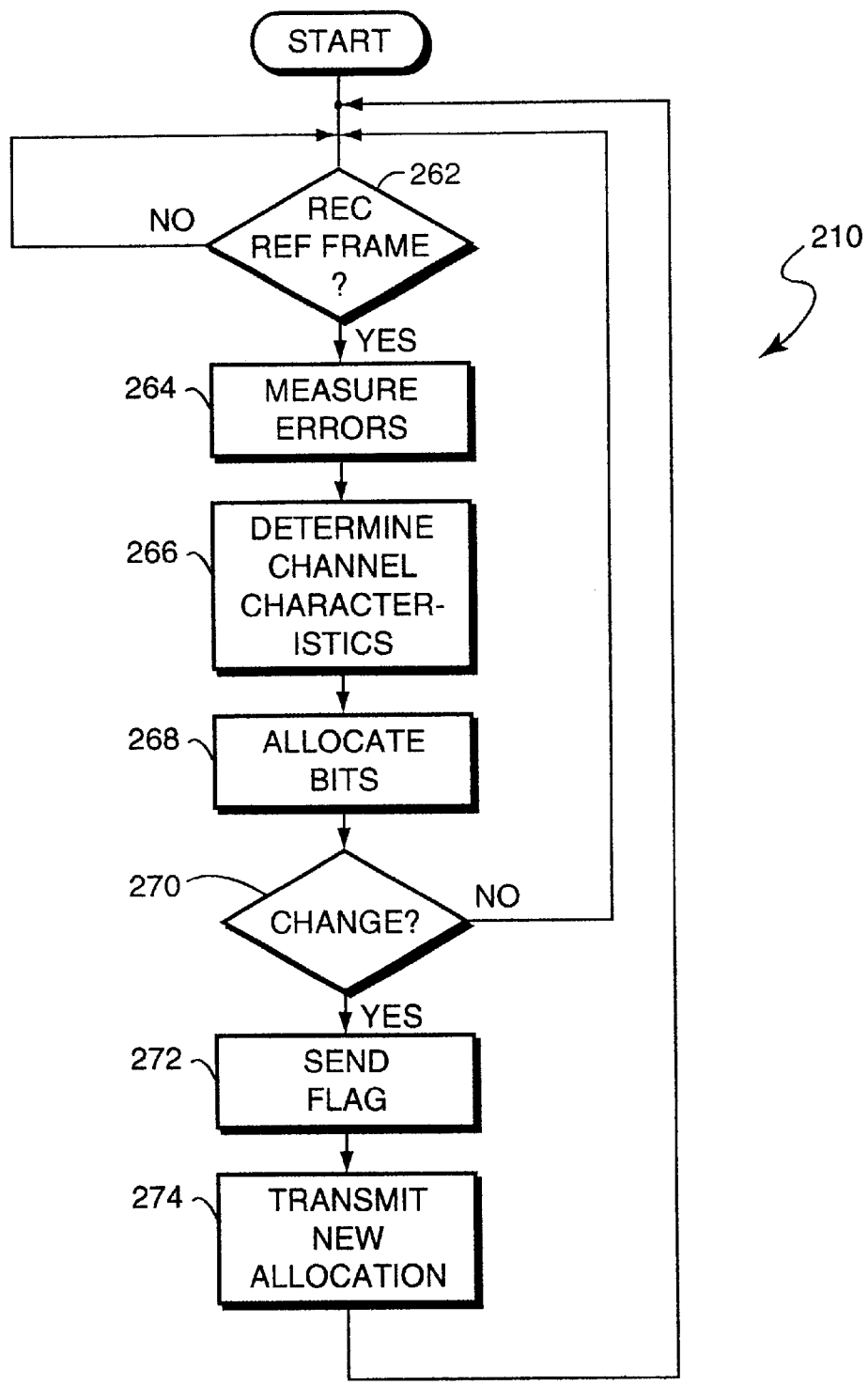
FIG. 8 is a flow chart illustrating operation of a receiver software for calculating, modifying, and synchronizing a change in a bit allocation table used in a multicarrier communication system.

Referring to FIG. 8, a flow chart 210 illustrates operation of software used by the receiver to allocate bits among the different carriers of the multicarrier signal and synchronize changes in the bit allocation table with the transmitter. Processing begins at a first test step 262 which determines if the receiver has received a reference frame. A reference frame is a predetermined and detectable frame of special data bits that is provided by the transmitter to the receiver to allow the receiver to determine the channel characteristics. In a preferred embodiment, the reference frame is transmitted periodically, although other conventional techniques can be used to determine whether the reference frame should be sent by the transmitter. The reference frame is recognized by the receiver using any one of a variety of conventional techniques such as a special header in a packet indicating that a reference frame is being provided. Use of a reference frame in connection with multicarrier communication is well-known in the art. If a reference frame is not received at the step 262, the software loops back to the test step 262 to poll for receipt of the reference frame.

If it is determined at the test step 262 that a reference frame has been received, then control transfers from the step 262 to a step 264 where the errors in the reference frame are measured with respect to the known constellation distances of the first signal. Note that since the reference frame is a predetermined signal, the receiver can know exactly what was sent by the transmitter. Therefore, any differences between the data received by the receiver and the expected values for signal data can be accounted for by errors induced by the transmission channel. These errors are measured at the step 264.

Following the step 264 is a step 266 where the receiver determines the channel characteristics based on the errors measured at the step 264. This is done in a conventional manner using techniques for determining channel characteristics based on detected transmission errors. Following the step 266 is a step 268 where the receiver allocates various bits among the carriers using, in a preferred embodiment, the technique disclosed above in connection with FIGS. 6 and 7.

Following the step 268 is a test step 270 which determines if the bit allocation table provided at the step 268 is different than the previous bit allocation table. That is, it is determined at the step 270 if there is a difference between the recently-calculated bit allocation table and the previous bit allocation table. If it is determined at the test step 270 that there is no difference (i.e., that the bit allocation table has not changed), then control transfers from the step 270 back to the step 262 where the software waits for the transmitter to send another reference frame. Otherwise, if it is determined at the step 270 that the new bit allocation table is different than the old bit allocation table, then control transfers from the step 270 to a step 272 where a flag is sent from the receiver to the transmitter indicating that the bit allocation table has changed. In a preferred embodiment, the flag is sent at the step 272 via a single carrier of the multicarrier signal that is reserved for use by the transmitter and receiver only for the flag. In another embodiment, the reserved carrier can also be used to transmit the new bit allocation table.

Following the step 272 is a step 274 where the receiver sends the new bit allocation table, determined at the step 268, to the transmitter. Following the step 274, control transfers back to the test step 262 to poll and wait for the transmitter to send another reference frame.

While the invention has been disclosed in connection with the preferred embodiments shown and described in detail, various modifications and improvements thereon will become readily apparent tot hose skilled in the art. Accordingly, the spirit and scope of the present invention is to be limited only by the following claims.

What is claimed is:

1. In a multicarrier transmission system including two communication units, a method for modulation bits onto subchannels of a communication channel between the two communication units, the method comprising:

allocating bits to subchannels of the communication channel according to a first bit allocation table;

monitoring the communication channel during transmission of the bits allocated to the subchannels according to the first bit allocation table;

developing a second bit allocation table at one of the communication units in response to monitoring the communication channel;

transmitting the second bit allocation table to the other of the communication units over the communication channel; and storing the first and second bit allocation tables at each of the communication units.

2. The method of claim 1 further comprising switching from the first bit allocation table to the second bit allocation table for allocating bits to the subchannels of the communication channel.

3. The method of claim 2 further comprising modifying the first bit allocation table during transmission of bits allocated to subchannels according to the second bit allocation table.

4. The method of claim 3 further comprising transmitting the modified first bit allocation table from one of the communication units to the other of the communication units.

5. The method of claim 4 further comprising replacing the first bit allocation table at that other of the communication units with the modified first bit allocation table.

6. The method of claim 1 further comprising transmitting a flag over the communication channel to synchronize switching from the first bit allocation table to the second bit allocation table for allocating bits to subchannels.

7. The method of claim 6 further comprising commencing use of the second bit allocation table for allocating bits to subchannels at a designated frame subsequent to transmission of the flag.

8. The method of claim 6 wherein the flag is transmitted over a particular one of the subchannels.

9. The method of claim 1 further comprising receiving a flag over the communication channel to synchronize switching from the first bit allocation table to the second bit allocation table for allocating bits to subchannels.

10. The method of claim 9 further comprising commencing use of the second bit allocating table for allocating bits to subchannels at a designated frame subsequent to receipt of the flag.

11. The method of claim 9 wherein the flag is received over a particular one of the subchannels.

12. In a multicarrier transmission system including two communication units, a method for modulating bits onto subchannels of a communication channel between the two communication units, the method comprising:

transmitting bits allocated to subchannels of the communication channel according to a first bit allocation table;

developing a second bit allocation table at one of the communication units;

transmitting the second bit allocation table to the other of the communication units over the communication channel; and storing the first and second bit allocation tables at each of the communication units.

13. The method of claim 12 further comprising transmitting a flag over the communication channel to synchronize switching from the first bit allocation table to the second bit allocation table for allocating bits to subchannels.

14. The method of claim 12 further comprising receiving a flag over the communication channel to synchronize switching from the first bit allocation table to the second bit allocation table for allocating bits to subchannels.

15. A transmitter in a multicarrier modulation system, comprising:

a first bit allocation table specifying a first allocation of bits to subchannels used during current communication with a receiver;

a second bit allocation table specifying a different allocation of bits to subchannels than the first bit allocation table; and a signaler transmitting a flag to synchronize from the first bit allocation table to the second bit allocation table for allocating bits to the subchannels, wherein the transmitter stores the second bit allocation table for use during subsequent communication with the receiver.

16. A receiver in a multicarrier modulation system, comprising:

a first bit allocation table specifying a first allocation of bits to subchannels used during current communication with a transmitter over a communication channel;

a second bit allocation table specifying a different allocation of bits to subchannels than the first bit allocation table; and a control unit developing the second bit allocation table, wherein the receiver stores the second bit allocation table for use during subsequent communication with the transmitter.

17. A receiver in a multicarrier modulation system, comprising:

a first bit allocation table specifying a first allocation of bits to subchannels used during current communication with a transmitter over a communication channel;

a second bit allocation table specifying a different allocation of bits to subchannels than the first bit allocation table; and a switch unit to receive a flag that synchronizes switching from the first bit allocation table to the second bit allocation table for allocating bits to the subchannels, wherein the receiver stores the second bit allocation table for use during subsequent communication with the transmitter.

18. A multicarrier transmission system, comprising:

a plurality of communication units in communication with each other over a communications channel having a plurality of subchannels, each communication unit storing a first bit allocation table that specifies a first allocation of bits to the subchannels for use during current communication with each other communication unit over the communication channel; and a second bit allocation table, stored by each of the communication units, specifying a different allocation of bits to subchannels than the first bit allocation tables, for use during subsequent communication between the communication units, wherein one of the communication units comprises a transmitter that transmits the second bit allocation table stored by that communication unit to another of the communication units for use during the subsequent communication between the communication units.

19. A multicarrier transmission system, comprising:

a plurality of communication units in communication with each other over a communications channel having a plurality of subchannels, each communication unit storing a first bit allocation table that specifies a first allocation of bits to the subchannels for use during current communication with each other communication unit over the communication channel; and a second bit allocation table, stored by each of the communication units, specifying a different allocation of bits to subchannels than the first bit allocation tables, for use during subsequent communication between the communication units, wherein one of the communication units comprises a signaler that transmits a flag to another of the communication units to synchronize switching from the first bit allocation tables to the second bit allocation tables for allocating bits to subchannels.

20. A multicarrier transmission system, comprising:

a plurality of communication units in communication with each other over a communications channel having a plurality of subchannels, each communication unit storing a first bit allocation table that specifies a first allocation of bits to the subchannels for use during current communication with each other communication unit over the communication channel; and a second bit allocation table, stored by each of the communication units, specifying a different allocation of bits to subchannels than the first bit allocation tables, for use during subsequent communication between the communication units, wherein one of the communication units comprises a control unit that develops the second bit allocation tables.

* * * * *